(12) United States Patent
Vadlamani

(10) Patent No.: US 10,855,722 B1
(45) Date of Patent: Dec. 1, 2020

(54) DECEPTION SERVICE FOR EMAIL ATTACKS

(71) Applicant: CA, Inc., San Jose, CA (US)

(72) Inventor: Ananta Krishna Vadlamani, Pleasanton, CA (US)

(73) Assignee: CA, Inc., San Jose, CA (US)

( * ) Notice: Subject to any disclaimer, the term of this patent is extended or adjusted under 35 U.S.C. 154(b) by 211 days.

(21) Appl. No.: 15/940,787

(22) Filed: Mar. 29, 2018

(51) Int. Cl.
*H04L 29/06* (2006.01)
*H04L 12/58* (2006.01)
*H04L 29/08* (2006.01)

(52) U.S. Cl.
CPC ...... *H04L 63/1491* (2013.01); *H04L 63/1416* (2013.01); *H04L 51/02* (2013.01); *H04L 67/22* (2013.01)

(58) Field of Classification Search
CPC . H04L 63/1491; H04L 63/1416; H04L 51/02; H04L 67/22
See application file for complete search history.

(56) References Cited

U.S. PATENT DOCUMENTS

| | | | | |
|---|---|---|---|---|
| 8,549,642 B2* | 10/2013 | Lee | ............ | H04L 51/12 709/203 |
| 10,367,797 B2* | 7/2019 | Keromytis | ............ | H04L 9/321 |
| 2007/0204343 A1* | 8/2007 | Black | ............ | G06F 21/55 726/23 |
| 2007/0261112 A1* | 11/2007 | Todd | ............ | G06F 21/577 726/11 |
| 2009/0228780 A1* | 9/2009 | McGeehan | ............ | G06F 21/55 715/234 |
| 2012/0084866 A1* | 4/2012 | Stolfo | ............ | G06F 21/554 726/25 |
| 2012/0246720 A1* | 9/2012 | Xie | ............ | H04L 51/12 726/22 |
| 2016/0134658 A1* | 5/2016 | Akiyama | ............ | G06F 21/55 726/23 |

(Continued)

OTHER PUBLICATIONS

"Attivo Networks®: Pre-Emptive Phishing Management", Attivo Networks, 5 pages, https://attivonetworks.com/documentation/Attivo_Networks-Spear_Phishing.pdf. [Retrieved Feb. 20, 2018].

(Continued)

*Primary Examiner* — Ghodrat Jamshidi
(74) *Attorney, Agent, or Firm* — Shook, Hardy & Bacon L.L.P.

(57) ABSTRACT

Systems, apparatuses, methods, and computer readable mediums for implementing an email deception service. A system includes one or more processors coupled to one or more memories storing program instructions. The program instructions are executable by the processor(s) to scan live emails for suspicious emails. The suspicious emails are emails with phishing links, business compromise emails, emails with malware attachments, and so on. When a suspicious email is detected, the processor(s) execute the program instructions to interact with the suspicious email in a way that mimics an end-user. A set of decoy credentials are provided to an attacker during the interaction, and then a decoy account is monitored for accesses by the attacker using the decoy credentials. Accesses to the decoy account are monitored and recorded to obtain intelligence on the attacker.

15 Claims, 6 Drawing Sheets

(56) References Cited

U.S. PATENT DOCUMENTS

| | | | | |
|---|---|---|---|---|
| 2016/0234249 | A1* | 8/2016 | Wong | H04L 61/1511 |
| 2016/0307191 | A1* | 10/2016 | Turgeman | G06Q 20/382 |
| 2017/0104592 | A1* | 4/2017 | Merdinger | G09C 5/00 |
| 2017/0223037 | A1* | 8/2017 | Singh | H04L 43/062 |
| 2017/0223046 | A1* | 8/2017 | Singh | H04L 43/062 |
| 2017/0289191 | A1* | 10/2017 | Thioux | H04L 63/1441 |
| 2017/0346851 | A1* | 11/2017 | Drake | H04L 63/0853 |
| 2018/0248896 | A1* | 8/2018 | Challita | G06F 21/554 |
| 2018/0324213 | A1* | 11/2018 | Borlick | G06N 20/00 |

OTHER PUBLICATIONS

Kerner, Sean Michael, "Illusive Networks Tricks Attackers With Email Data Deceptions", eWeek.com, Jun. 12, 2017, 3 pages, http://www.eweek.com/security/illusive-networks-tricks-attackers-with-email-data-deceptions. [Retrieved Feb. 20, 2018].

* cited by examiner

DECEPTION SERVICE FOR EMAIL ATTACKS

BACKGROUND

Technical Field

Embodiments described herein relate to computer systems and more particularly, to implementing an email deception service to deceive would-be attackers.

Description of the Related Art

Computing devices are increasingly vulnerable to different types of phishing, business compromise, and malware attacks. For example, an attacker may generate a carefully crafted email and send this email to an unsuspecting user asking for user credentials or other sensitive information. The email may appear genuine to the user by including details that were generated based on research performed by the attacker. Preventing these types of attacks can be challenging because an end-user may unwittingly respond to the email and provide the attacker with information that the attacker can then use to gain unauthorized access to a privileged account or other sensitive information.

SUMMARY

Systems, apparatuses, and methods for implementing an email deception service are disclosed herein.

In one embodiment, a system includes a client device coupled to a network, with the client device including one or more processors and one or more memory devices. The memory devices store program instructions of a plurality of software applications, including at least an email application and a deception service agent. When executed by the processor(s), the deception service agent scans live emails in a user inbox. When the detection agent detects a suspicious email, the deception service agent performs a series of actions to interact with the suspicious email in way that mimics the actions of an end-user. A suspicious email may include a phishing link, a request for account credentials, a request for financial information, a request for a wire transfer, a malware or ransomware attachment, or otherwise. For example, in various embodiments, a database may be accessed to determine if an email is deemed suspicious. Such a database may include information usable to identify emails that have previously been determined to correspond to an attacker or otherwise include characteristics associated with email attacks.

In response to detecting the suspicious email, the deception service agent also extracts data from the suspicious email and analyzes the extracted data. The deception service agent interacts with the suspicious email in manner that is based on the analysis of the extracted data. For example, if the suspicious email includes a uniform resource locator (URL) link, the deception service agent executes a series of instructions that simulate an end-user actually clicking on the link. Then, when a browser application is opened to navigate to the website identified by the URL link, the deception service agent fills in information in various fields or generates clicks on additional links on the website. At some point, when the website asks for credentials to a particular account, the deception service agent provides a set of decoy credentials to the website.

In another example, if the suspicious email includes a request for credentials or other sensitive information, the deception service agent responds to the email by generated a response email that simulates what an end-user might actually send. For example, the response email includes a greeting and other text such as what a user would generate. Also, in one embodiment, the deception service agent inserts one or two typos within the body of the email to make it appear as though a user mistyped a word or two. The deception service agent also inserts other types of text, symbols, or attachments into the email that are indicative of an actual end-user.

Once the deception service agent provides a set of decoy credentials to the attacker, the deception service agent starts monitoring a decoy account that matches the set of decoy credentials. The decoy account may be setup before hand or the decoy account may be created on-the-fly in response to detecting the suspicious email. When the attacker attempts to login to the decoy account, the deception service agent records the actions of the attacker while accessing the decoy account. The deception service agent analyzes the actions of the attacker. Based on the analysis of the attacker's actions, the deception service agent creates enhanced detection, user mimicking, and/or other tools. The deception service agent also notifies the appropriate authorities of the attackers' actions.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising one or more processors . . . ." Such a claim does not foreclose the system from including additional components (e.g., a display unit, a storage unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a system with a plurality of processors, the terms "first" and "second" processors can be used to refer to any two of the plurality of processors.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
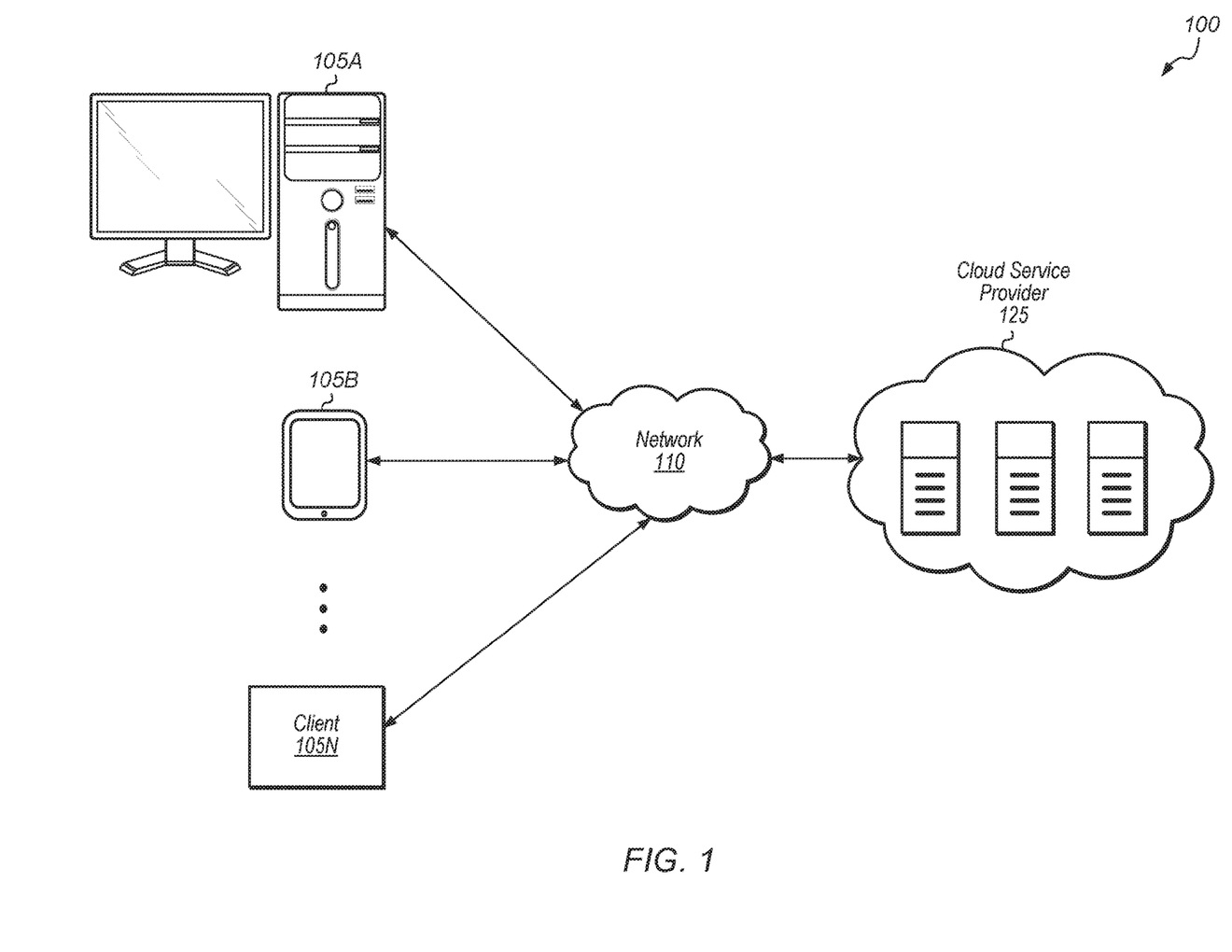
FIG. 1 is a block diagram of one embodiment of a system.

Referring now to FIG. 1, a block diagram of one embodiment of a system 100 is shown. System 100 includes clients 105A-N, network 110, and cloud service provider 125. Cloud service provider 125 may include any number and type of physical machines, such as computers and/or servers (e.g., database server, file server, application server), and any number and type of storage devices. The physical machines of cloud service provider 125 include any number and type of processors for executing program instructions. Cloud service provider 125 may include any number and type of software applications and agents executing on the processors. It should be understood that cloud service provider 125 is representative of any type of public or private data center. It is also noted that system 100 may include other components and/or the components may be arranged differently in other embodiments.

In one embodiment, client 105A is a desktop computer, client 105B is a mobile device, and one or more other clients 105N may be any of various other types of computing devices or computing systems. It is noted that a client may also be referred to as an "endpoint" or a "machine". Also, the term "machine" may be used to refer to any type of computing device or computing system. In one embodiment, each client 105A-N executes one or more software agents that are part of an email deception service application that monitors live emails and provides decoy credentials to an attacker while mimicking end-user behavior. In this embodiment, one or more of the software agents of the email deception service application are also executing in cloud service provider 125.

In one embodiment, a detection agent executes on each of clients 105A-N to monitor live emails for any suspicious emails that contain phishing links, attributes of a business compromise email, or other suspicious characteristics. As used herein, the term "live email" is defined as an actual email that has been sent by another entity and is either inbound to a user's inbox or already in the user's inbox. A "live email" is differentiated from a simulated email which is generated for testing and/or training purposes. The detection agent may utilize any of a variety of tools for detecting suspicious emails, with the tools varying from embodiment to embodiment. For example, the detection agent can use a blacklist, a whitelist, dynamic analysis, or other techniques to detect suspicious emails.

In one embodiment, a simulated user agent executes on each of clients 105A-N and/or on cloud service provider 125. The simulated user agent mimics the actions of an end-user when a suspicious email is detected. The simulated user agent provides a set of decoy credentials to an attacker while taking actions that attempt to convince the attacker that the decoy credentials are actual legitimate credentials. In one embodiment, a monitoring agent executes on cloud service provider 125 to monitor a decoy account that is accessible using the decoy credentials provided to the attacker. The monitoring agent records any actions performed by an attacker logging into and accessing the decoy account. In one embodiment, the decoy account is hosted by cloud service provider 125.

Network 110 may be any type of network or combination of networks, including wireless connection, direct local area network (LAN), metropolitan area network (MAN), wide area network (WAN), a Public Switched Telephone Network (PSTN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 110 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 110.

Clients 105A-N are representative of any number of stationary or mobile computers such as desktop personal computers (PCs), mobile devices, servers, server farms, workstations, laptops, handheld computers, servers, personal digital assistants (PDAs), smart phones, tablets, wearable devices, and so forth. Generally speaking, clients 105A-N include one or more processors comprising one or more processor cores. Each processor core includes circuitry for executing instructions according to an instruction set architecture. The processor cores may access cache memory subsystems for data and computer program instructions. The cache subsystems may be coupled to a memory hierarchy comprising random access memory (RAM) and a storage device.

Figure 2:
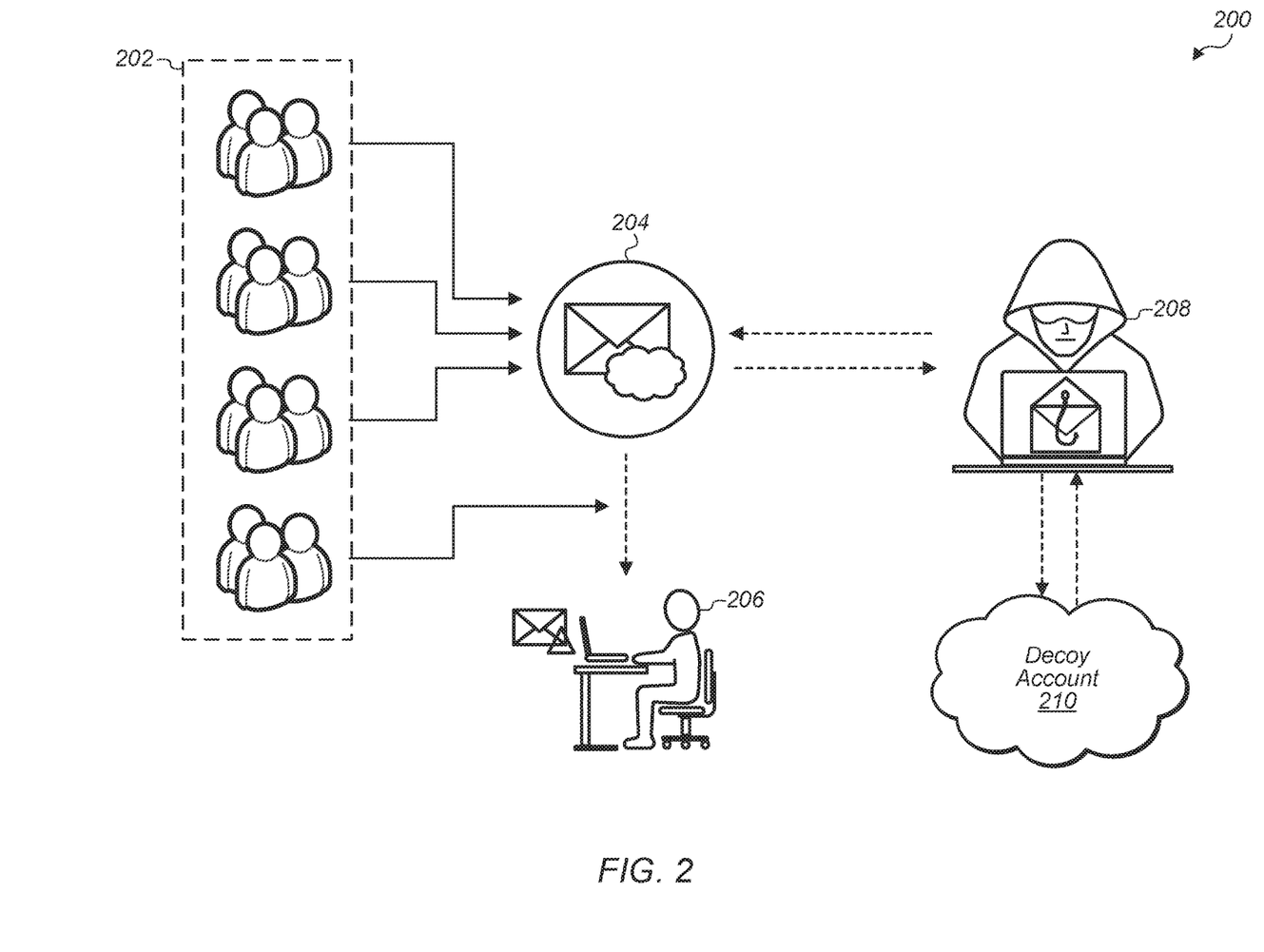
FIG. 2 is a diagram of one embodiment of a computing environment.

Turning now to FIG. 2, a block diagram of one embodiment of a computing environment 200 is shown. In one embodiment, computing environment 200 is associated with a single organization having a plurality of users 202. In another embodiment, computing environment 200 is a cloud-based system managing various services for a plurality of organizations. In a further embodiment, computing environment 200 is utilized by a single individual. In other embodiments, computing environment 200 is other types of computing systems and/or networks. In various embodiments, computing environment 200 executes the program instructions of one or more deception service agents for detecting, interacting with, and recording actions taken by an attacker 208.

Computing environment 200 includes any number of individuals 202 who are accessing live emails represented by email server 204. It is noted that email server 204 may also be referred to as an "email application" herein. In one embodiment, email server 204 stores live emails for a plurality of users 202. When an attacker 208 sends a suspicious email to one of users 202, the suspicious email will be stored in the inbox of the user, and the user will have an opportunity to respond to the email and/or click any links within the email. When the suspicious email is detected, the deception service agents will interact with the suspicious email in a manner that emulates an actual end-user.

In one embodiment, the various deception service agents executing on computing environment 200 are activated when a deception mode is enabled. In one embodiment, the deception mode is enabled by default for users 202 of email server 204. In another embodiment, a user enables a deception mode for emails in a graphical user interface (GUI) generated by an application provided by email server 204. When deception mode is enabled, the deception service agent(s) will start monitoring the live emails that are inbound to and/or stored in email server 204. Next, when the attacker 208 sends an email with a phishing link to the user who has enabled deception mode, a deception service agent will detect the email as a suspicious email. Next, a deception service agent will interact with the email (i.e., click on a link embedded within the email) or respond to the email as if the agent were the actual end user being targeted by attacker 208. As part of interacting with the email, the deception service agent will provide the attacker with decoy credentials to a decoy account 210. The decoy account 210 is a fake account but one that will appear to the attacker 208 as if it were a real account that the attacker 208 wishes to access. For example, if the decoy account is for a particular cloud service, financial service provider, or email account, the decoy account will be presented in a way that matches an actual account with one of these entities. The decoy account 210 is also isolated from real accounts in a way that prevents attacker 208 from being able to access any real data.

Next, the deception service agent will monitor the decoy account 210 for a login attempt by attacker 208 with the decoy credentials. When attacker 208 accesses the decoy account 210, the deception service agent will detect the access and start recording the actions of attacker 208 as well as capturing information about where attacker 208 is logging in from, the type of connection, the time of day, and so on. The deception service agent will also notify the system administrator 206 for the host organization of computing environment 200 and provide the recorded information obtained while attacker 208 accesses decoy account 210.

Figure 3:
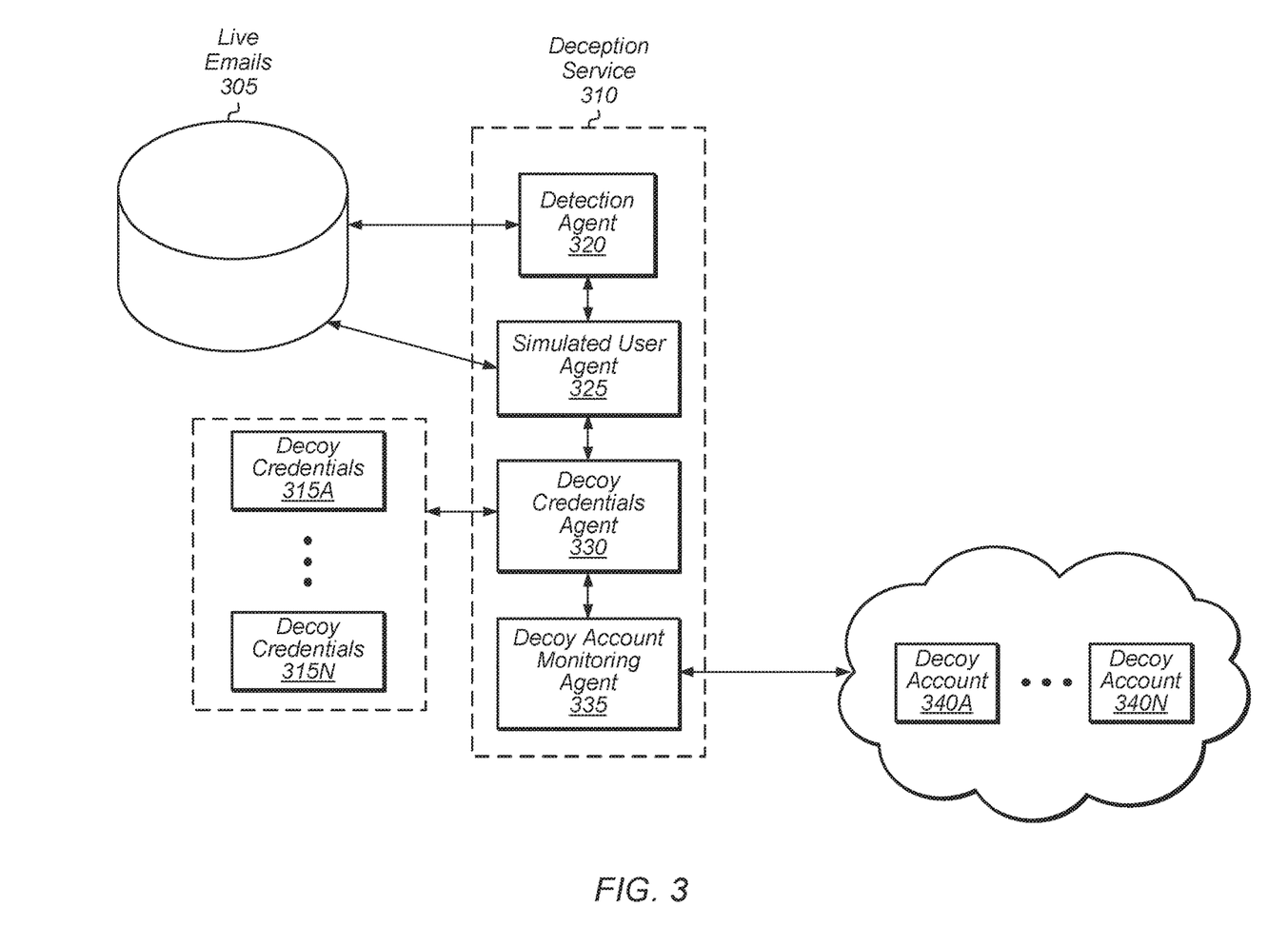
FIG. 3 is a diagram of one embodiment of a deception service.

Referring now to FIG. 3, a block diagram of one embodiment of a deception service 310 is shown. In one embodiment, deception service 310 includes multiple components to perform different functions. In some cases, the different components are implemented as separate hardware and/or software agents. In other cases, two or more of the different components shown within the dashed box of deception service 310 are combined into a single hardware and/or software agent. Additionally, in other embodiments, deception service 310 may be split up into other numbers and types of components for implementing various functions.

Each component of deception service 310 is implemented using any suitable combination of hardware and/or software. In one embodiment, the components of deception service 310 are software agents. For example, in one embodiment, detection agent 320 is a software agent executing on or in conjunction with the email server of a host organization. In this embodiment, simulated user agent 325, decoy credentials agent 330, and decoy account monitoring agent 335 are software agents executing on a server of the host organization or on a cloud service provider. In other embodiments, one or more of the components (or portions thereof) of deception service 310 are implemented using dedicated hardware.

In one embodiment, deception service 310 includes detection agent 320 which scans live emails 305 for suspicious emails. Emails with phishing links, business email compromise (BEC) attacks, malware attachments, or other types of emails are detected by detection agent 320. A BEC attack is a type of scam that attempts to trick unsuspecting executives and/or other employees into unauthorized wire transfers or other payments. A BEC attack typically relies on social engineering to generate carefully crafted emails that target specific victims and/or organizations. When detection agent 320 detects a suspicious email, detection agent 320 notifies simulated user agent 325. Simulated user agent 325 generates actions to mimic a user and interact with the suspicious email. These actions include (but are not limited to) clicking on a link within an email, generating an reply to an email, forwarding the email, composing a new email, and so on. While mimicking an end-user, simulated user agent 325 queries decoy credentials agent 330 to select or generate a set of decoy credentials 315A-N which simulated user agent 325 will use when responding to the suspicious email or otherwise interacting with the attacker. In one embodiment, decoy credentials agent 330 selects a set of decoy credentials from previously generated decoy credentials 315A-N. For example, the previously generated decoy credentials 315A-N include different types of credentials for different types of decoy accounts 340A-N. Decoy credentials agent 330 will then select from the most appropriate set of previously generated decoy credentials 315A-N based on information obtained from the suspicious email.

In another embodiment, decoy credentials agent 330 generates a new set of decoy credentials 315A-N based on information provided by simulated user agent 325. This information is obtained and/or generated from data extracted from the suspicious email. For example, if the suspicious email is asking for credentials for a financial services website, then decoy credential agent 330 generates a username and password that will provide access to a decoy financial service account. Or if the suspicious email is asking for credentials for a company's internal network or specific applications, then decoy credential agent 330 generates a username and password that will provide access to a decoy account on the company's internal network or applications. Other types of decoy credentials and decoy accounts are possible and are contemplated.

Once the set of decoy credentials 315A-N are provided to the attacker, decoy account monitoring agent 335 will start monitoring the corresponding decoy account 340A-N. In the case when a previously generated set of decoy credentials 315A-N are provided to the attacker, there may be a decoy account 340A-N which already exists. Decoy account monitoring agent 335 will then monitor this specific decoy account 340A-N. In the case where a new set of decoy credentials 315A-N are created and provided to the attacker, a new decoy account may need to be generated. In this case, decoy credentials agent 330 or decoy account monitoring agent 335 generates the new decoy account 340A-N based on information extracted from the suspicious email. For example, in one embodiment, a URL is extracted from the suspicious email, and then based on the address of the extracted URL, the decoy credentials agent 330 determines which type of account the attacker is seeking to access. Then, decoy credentials agent generates a new decoy account 340A-N that matches the specific type of account.

In various embodiments, the decoy credentials agent 330 uses an application programming interface (API) established with a service provider to generate a new decoy account 340A-N. For example, in one embodiment, the service provider is a financial institution, and the decoy credentials agent 330 uses the API to generate a new decoy bank account 340A-N that will match the newly generated set of decoy credentials 315A-N. In another embodiment, the service provider is a cloud service provider, and the decoy credentials agent 330 uses the API to generate a new decoy cloud account 340A-N that will match the newly generated set of decoy credentials 315A-N. In some cases, users can also create decoy accounts and then deception service 310 can use these user-created decoy accounts. In other embodiments, other types of decoy accounts 340A-N may be created.

Once decoy account monitoring agent 335 starts monitoring the decoy account 340A-N, if an attempt by the attacker to login to this decoy account 340A-N is detected, then decoy account monitoring agent 335 will record all activity by the attacker while the attacker is logged into the decoy account 340A-N. Decoy account monitoring agent 335 will also record information that can be gleaned from the attacker, such as where the attacker is logging in from, the time of day, the type of connection the attacker is using, the download/upload speeds of the connection, and so on. For example, intelligence gathered includes (but is not limited to) attacker origins (e.g., IP address, location), attacker behavior, (e.g., time of login, manual or automated, linguistic analysis of emails sent), attacker intent (e.g., looking for sensitive information, mailing other internal employees and other external parties), attack vectors (e.g., additional URLs, attachments, mail servers information used), any bitcoin or financial entity information for funds transfer, and others. This information is then analyzed to update and enhance detection agent 320 in order to prevent future attacks. This information is also provided to the appropriate authorities (e.g., administrator, the organization's security team, law enforcement officials) to protect the organization and/or to apprehend the attacker. Additionally, the information obtained from monitoring the attacker access the decoy account 340A-N is also utilized to modify and improve simulated user agent 325.

For example, in one embodiment, if a set of decoy credentials 315A-N are provided to the attacker, and no attempt to login into the decoy account 340A-N is made by the attacker, then simulated user agent 325 is updated to provide a more authentic interaction with future attackers. It may be assumed that if the attacker does not attempt to login to the decoy account 340A-N using the supplied decoy credentials 315A-N, the attacker was able to determine that the credentials were not legitimate and/or the simulated user agent 325 was not a real user. Different types of interactions may be utilized by simulated user agent 325 when responding to subsequent suspicious email, and the types of interactions that result in the highest percentage of attempts by the attacker to login to a decoy account 340A-N are determined. These types of interactions may be repeated more frequently in the future. In various embodiments, simulated user agent 325 will have machine learning or artificial intelligence capabilities to respond to the attacker and to adapt to the threat landscape. For example, instead of clicking on links in an email directly, simulated user agent 325 will find and click on a link that is embedded in a portable document format (PDF) or word document.

Figure 4:
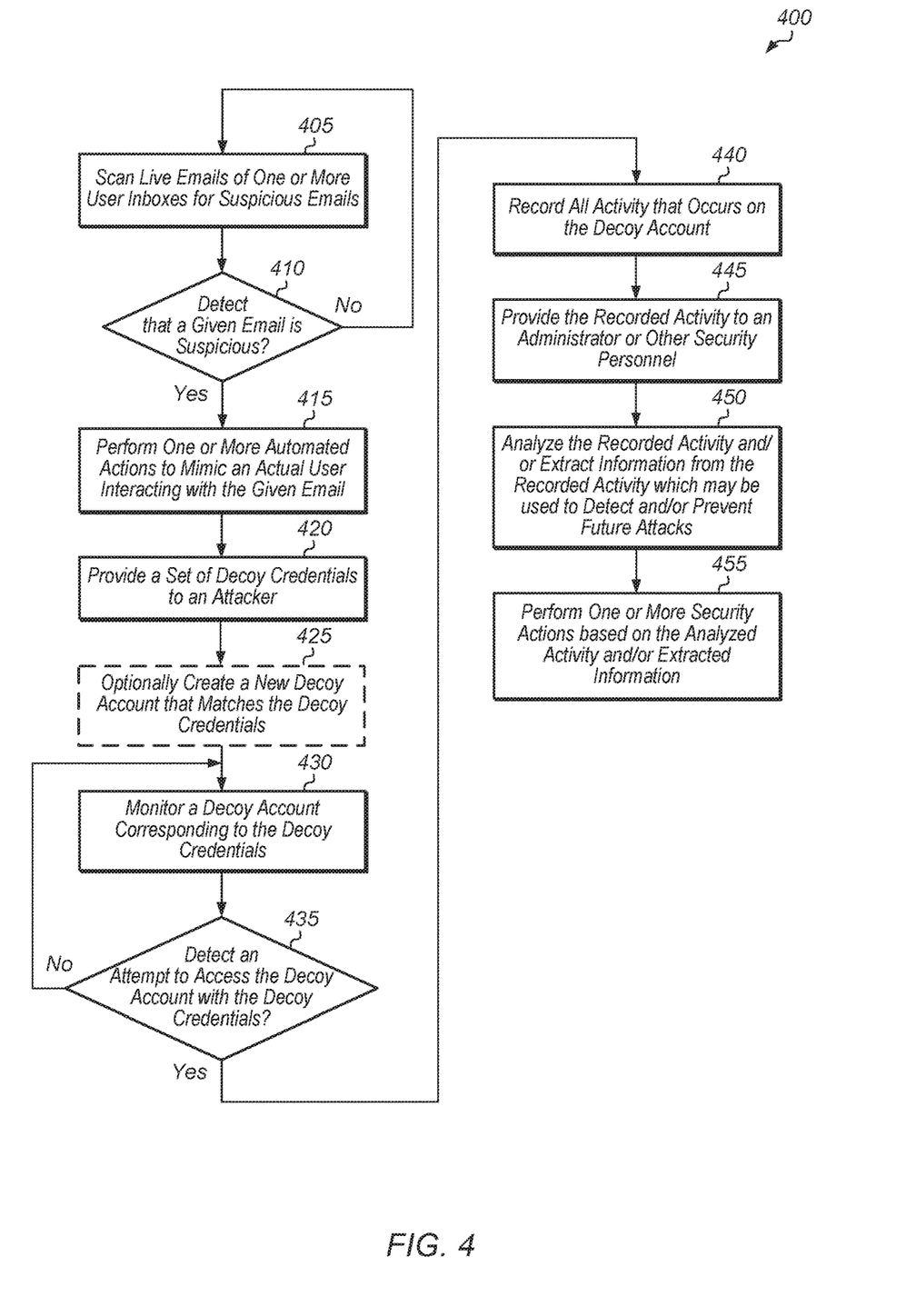
FIG. 4 is a generalized flow diagram illustrating one embodiment of a method for implementing an email deception service.

Turning now to FIG. 4, one embodiment of a method 400 for implementing an email deception service is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 400.

A deception service agent scans live emails of one or more user inboxes for suspicious emails (block 405). In one embodiment, the deception service agent is implemented by a computer system with one or more processors coupled to one or more memories. The one or more memories store computer executable program code and the one or more processors execute the program code to perform the operations described in method 400. If the deception service agent detects that a given email is suspicious (conditional block 410, "yes" leg), then the deception service agent performs one or more automated (i.e., computer-generated) actions to mimic an actual user interacting with the given email (block 415). Depending on the embodiment, the one or more automated actions include (but are not limited to) clicking on a link within the given email, generating the text of a message of an email and then sending the email to a recipient, attaching a file, image, or other attachment to an email reply, and so on. If the deception service agent does not detect any suspicious emails (conditional block 410, "no" leg), then method 400 returns to block 405.

Next, the deception service agent provides a set of decoy credentials (e.g., username and password) to an attacker (i.e., the author of the given email) (block 420). In one embodiment, the set of decoy credentials are previously generated and the deception service agent retrieves the set of decoy credentials from a memory device. In another embodiment, the set of decoy credentials are generated in real-time in response to detecting that the given email is suspicious. If the set of decoy credentials are generated in real-time in response to detecting that the given email is suspicious, the deception service agent optionally creates a new decoy account that matches the newly generated decoy credentials (block 425).

Then, after block 425, the deception service agent monitors a decoy account corresponding to the decoy credentials (block 430). It should be understood that the decoy account is made to appear as though it is a legitimate account to which the attacker seeks access, but which in actuality has no information of real value. Rather, the decoy account includes false information which may appear to the attacker to be real. Any of various techniques for creating a decoy account are possible and are contemplated.

If the deception service agent detects an attempt to access the decoy account with the decoy credentials (conditional block 435, "yes" leg), then the deception service agent records all activity that occurs on the decoy account (block 440). If the deception service agent does not detect an attempt to access the decoy account with the decoy credentials (conditional block 435, "no" leg), then method 400 returns to block 430 with the deception service agent continuing to monitor attempts to login to the decoy account with the decoy credentials. Next, the deception service agent provides the recorded activity to an administrator or other security personnel (block 445). It is noted that the deception service agent also analyzes the recorded activity and/or extracts information (e.g., Internet Protocol (IP) address) from the recorded activity which may be used to detect and/or prevent future attacks (block 450). Then, the deception service agent performs one or more security actions based on the analyzed activity and/or extracted information (block 455). The one or more security actions include (but are not limited to) updating the detection agent to improve its ability to detect future attacks, notifying an administrator or other security personnel, generating a warning (e.g., popup, dialog box), disabling network access on infected machine(s), launching a security application, scanning machine(s) or network(s) for malware, and/or other actions. The analysis and extracted information is used to help refine and improve the deception service agent to prevent future attacks and to help in deceiving future attackers with improved decoy operations, accounts, credentials, and the like. In other embodiments, the deception service agent also performs additional actions in response to detecting the login attempt to the decoy account with the decoy credentials. For example, in another embodiment, the second agent generates additional emails or responses to the attacker to continue to deceive the attacker and to make the attacker think that the decoy account is a legitimate account with useful information. After block 455, method 400 ends. It is noted that in various embodiments, there may be different numbers and types of software agents that perform the different steps of method 400.

Figure 5:
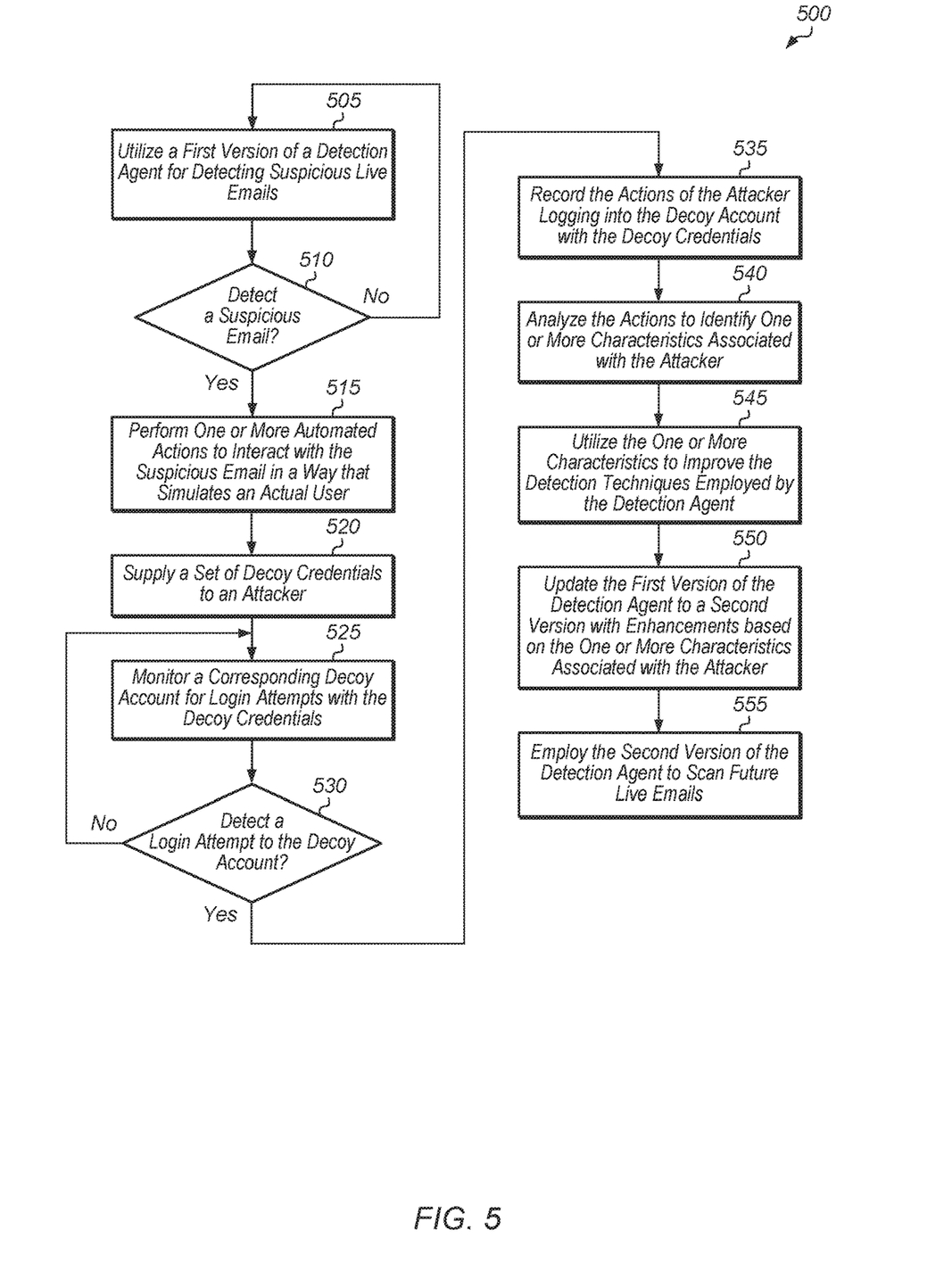
FIG. 5 is a generalized flow diagram illustrating one embodiment of a method for improving a detection agent.

Referring now to FIG. 5, one embodiment of a method 500 for improving a detection agent is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 500.

A deception service utilizes a first version of a detection agent for detecting suspicious live emails (block 505). If the first version of the detection agent detects a suspicious live email (conditional block 510, "yes" leg), then a decoy agent performs one or more automated actions to interact with the suspicious live email in a way that simulates an actual user (block 515). Also, while interacting with the suspicious live email, the decoy agent supplies a set of decoy credentials to an attacker (block 520). If the first version of the detection agent does not detect a suspicious live email (conditional block 510, "no" leg), then method 500 returns to block 505.

After block 520, a monitoring agent monitors a corresponding decoy account for login attempts with the decoy credentials (block 525). If a login attempt is detected to the decoy account using the decoy credentials (conditional block 530, "yes" leg), then the monitoring agent records the actions of the attacker logging into the decoy account with the decoy credentials (block 535). Next, the actions are analyzed to identify one or more characteristics associated with the attacker (block 540). For example, the one or more characteristics may include an IP address of the attacker, searches that were performed by the attacker when accessing the decoy account, locations and/or files accessed within the decoy account, and so on.

Then, these one or more characteristics are utilized to update and improve the detection techniques employed by the detection agent (block 545). Next, the first version of the detection agent is updated to a second version with enhancements based on the one or more characteristics associated with the attacker (block 550). Then, the second version of the detection agent is employed for scanning future live emails (block 555). After block 555, method 500 ends. It should be understood that the second version of the detection agent is different from (i.e., a subsequent version of) the first version of the detection agent. It should also be understood that the above steps are performed in an automated fashion by software tools to automatically update the detection agent to a new version with improvements based on detected characteristics of attackers. Method 500 may also be repeated each time a suspicious live email is detected and/or each time an attacker accesses a decoy account, with subsequent iterations of method 500 implemented to update the detection agent to a third version, a fourth version, and so on.

Figure 6:
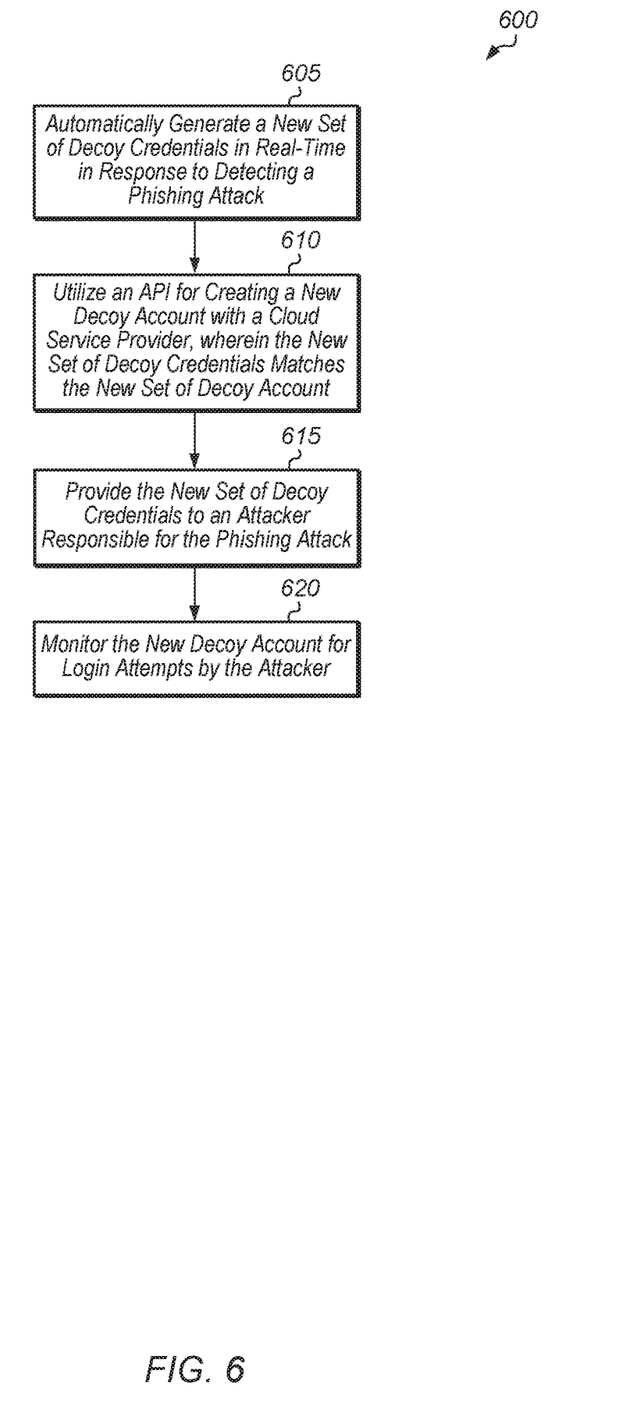
FIG. 6 is a block diagram of one embodiment of a system for automated generation of a new decoy account.

Turning now to FIG. 6, one embodiment of a method 600 for automated generation of a new decoy account is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 600.

A deception service agent automatically generates a new set of decoy credentials in real-time in response to detecting a phishing attack (block 605). Next, the deception service agent utilizes an API for creating a new decoy account with a cloud service provider, wherein the new set of decoy credentials matches the new decoy account (block 610). Any type decoy account (e.g., bank account, email account, cloud service account) hosted by any type of cloud service provider (or other type of provider or organization) may be created in block 610. Then, the deception service agent provides the new set of decoy credentials to an attacker responsible for the phishing attack (block 615). Next, the deception service agent monitors the new decoy account for login attempts by the attacker (block 620). After block 620, method 600 ends. It is noted that in one embodiment, the steps of method 600 are implemented by one or more processors executing program instructions. Additionally, it should be understood that the deception service agent may be implemented as multiple different software agents executing on one or more different computing platforms. It is also noted that the end-user or local administrator can create decoy accounts and provide the information about the decoy accounts to the deception service agent.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a memory storing program instructions;
   a processor coupled to the memory and configured to execute the program instructions, wherein the program instructions are executable by the processor to:
   scan live emails for suspicious emails;
   responsive to detecting a suspicious email, determine which type of account an attacker is seeking to access;
   utilizing an application programming interface (API) established with a service provider corresponding to the type of account, generate a decoy account and a set of decoy credentials, wherein the decoy account and the decoy credentials are generated from data extracted from the suspicious email;
   generate a response to the attacker responsible for the suspicious email, the response including the set of decoy credentials; and
   send the response to the attacker responsible for the suspicious email.

2. The system as recited in claim 1, wherein the program instructions are further executable by the processor to perform one or more security actions responsive to detecting an access to a decoy account, wherein the decoy account corresponds to the set of decoy credentials.

3. The system as recited in claim 1, wherein the program instructions are further executable by the processor to monitor a decoy account for login attempts by the attacker, wherein the decoy account corresponds to the set of decoy credentials.

4. The system as recited in claim 3, wherein the program instructions are further executable by the processor to:
   analyze actions performed by the attacker when accessing the decoy account;
   identify one or more characteristics associated with the attacker based on analyzing actions performed by the attacker;
   update a detection agent based on the one or more characteristics associated with the attacker; and
   utilize an updated version of the detection agent to detect future attacks.

5. The system as recited in claim 1, wherein the suspicious email asks for credentials for a financial services website, the decoy account is a decoy financial service account and the set of decoy credentials includes a username and password that provides access to the decoy financial service account.

6. A method for responding to suspicious email, the method comprising:
   scanning, by a processor, live emails for suspicious emails;
   responsive to detecting a suspicious email, determine which type of account an attacker is seeking to access;
   utilizing an application programming interface (API) established with a service provider corresponding to the type of account, generating, by the processor, a decoy account and a set of decoy credentials, wherein the decoy account and the decoy credentials are generated from data extracted from the suspicious email;
   generating, by the processor, a response to the attacker responsible for the suspicious email, the response including the set of decoy credentials; and
   sending, by the processor, the response to the attacker responsible for the suspicious email.

7. The method as recited in claim 6, further comprising performing one or more security actions responsive to detecting an access to a decoy account, wherein the decoy account corresponds to the set of decoy credentials.

8. The method as recited in claim 6, further comprising monitoring a decoy account for login attempts by the attacker, wherein the decoy account corresponds to the set of decoy credentials.

9. The method as recited in claim 8, further comprising:
   analyzing actions performed by the attacker when accessing the decoy account;
   identifying one or more characteristics associated with the attacker based on analyzing actions performed by the attacker;
   updating a detection agent based on the one or more characteristics associated with the attacker; and
   utilizing an updated version of the detection agent to detect future attacks.

10. The method as recited in claim 6, wherein the suspicious email asks for credentials for a financial services website, the decoy account is a decoy financial service account and the set of decoy credentials includes a username and password that provides access to the decoy financial service account.

11. A non-transitory computer readable storage medium storing program instructions, wherein the program instructions are executable by a processor to:
    scan live emails for suspicious emails;
    responsive to detecting a suspicious email, determine which type of account an attacker is seeking to access;
    utilizing an application programming interface (API) established with a service provider corresponding to the type of account, generate a decoy account and a set of decoy credentials, wherein the decoy account and the decoy credentials are generated from data extracted from the suspicious email;
    generate a response to the attacker responsible for the suspicious email, the response including the set of decoy credentials; and
    send the response to the attacker responsible for the suspicious email.

12. The non-transitory computer readable storage medium as recited in claim 11, wherein the program instructions are further executable by a processor to perform one or more security actions responsive to detecting an access to a decoy account, wherein the decoy account corresponds to the set of decoy credentials.

13. The non-transitory computer readable storage medium as recited in claim 11, wherein the program instructions are further executable by a processor to monitor a decoy account for login attempts by the attacker, wherein the decoy account corresponds to the set of decoy credentials.

14. The non-transitory computer readable storage medium as recited in claim 13, wherein:
- analyze actions performed by the attacker when accessing the decoy account;
- identify one or more characteristics associated with the attacker based on analyzing actions performed by the attacker;
- update a detection agent based on the one or more characteristics associated with the attacker; and
- utilize an updated version of the detection agent to detect future attacks.

15. The non-transitory computer readable storage medium as recited in claim 11, wherein the suspicious email asks for credentials for a financial services website, the decoy account is a decoy financial service account and the set of decoy credentials includes a username and password that provides access to the decoy financial service account.

\* \* \* \* \*